United States Patent [19]

Lewis

[11] Patent Number: 5,375,881
[45] Date of Patent: Dec. 27, 1994

[54] ENERGY ABSORPTION SYSTEM INCLUDING A U-SHAPED DEFORMABLE MEMBER AND A DEFORMING MEMBER

[75] Inventor: Michael K. Lewis, Sandbach, England

[73] Assignee: Rolls-Royce Motor Cars Limited, Cheshire, England

[21] Appl. No.: 210,411

[22] Filed: Mar. 18, 1994

Related U.S. Application Data

[63] Continuation of Ser. No. 942,318, Sep. 11, 1992, abandoned, which is a continuation-in-part of Ser. No. 620,764, Dec. 3, 1990, abandoned.

[30] Foreign Application Priority Data

Sep. 5, 1990 [GB] United Kingdom ............... 9019408

[51] Int. Cl.⁵ ............................................. B62D 1/18
[52] U.S. Cl. ................................... 280/777; 74/492; 188/374
[58] Field of Search ............... 188/371, 374, 376, 377; 74/492; 280/777, 750, 806, 751, 748; 293/133

[56] References Cited

U.S. PATENT DOCUMENTS

| | | | |
|---|---|---|---|
| 2,578,903 | 12/1951 | Smith | 188/374 |
| 3,298,465 | 1/1967 | Stastny | 188/377 |
| 3,599,757 | 8/1971 | Takamatsu | 188/371 |
| 3,948,539 | 4/1976 | Murase | 280/777 |
| 4,117,741 | 10/1978 | Yazane | 188/376 |
| 4,630,716 | 12/1986 | Faust | 188/371 |
| 4,778,208 | 10/1988 | Lehr et al. | 188/371 |
| 4,915,412 | 4/1990 | Yuzuriha | 280/777 |
| 4,951,522 | 8/1990 | Chowdhury et al. | 280/777 |
| 5,228,359 | 7/1993 | Thomas | 188/371 |

FOREIGN PATENT DOCUMENTS

| | | | |
|---|---|---|---|
| 63-315347 | 12/1988 | Japan | 280/751 |
| 1397757 | 6/1975 | United Kingdom | 293/133 |

Primary Examiner—Karin L. Tyson
Attorney, Agent, or Firm—Cushman, Darby & Cushman

[57] ABSTRACT

A collapsible steering column arrangement for a vehicle comprises a U-shaped deformable member connected to a fixed support for the steering column and a deforming member connected to the steering column itself. Under impact conditions caused by an accident the members move relative to one another thus allowing the steering column to collapse. This relative movement of the members enables the deforming member to contact the base of the 'U' to deform the U-shaped deformable member to reduce its overall length thus absorbing the energy of the impact and allowing the column to collapse in a controlled manner. The members can be shaped and dimensioned to give the desired energy absorption characteristics.

5 Claims, 7 Drawing Sheets

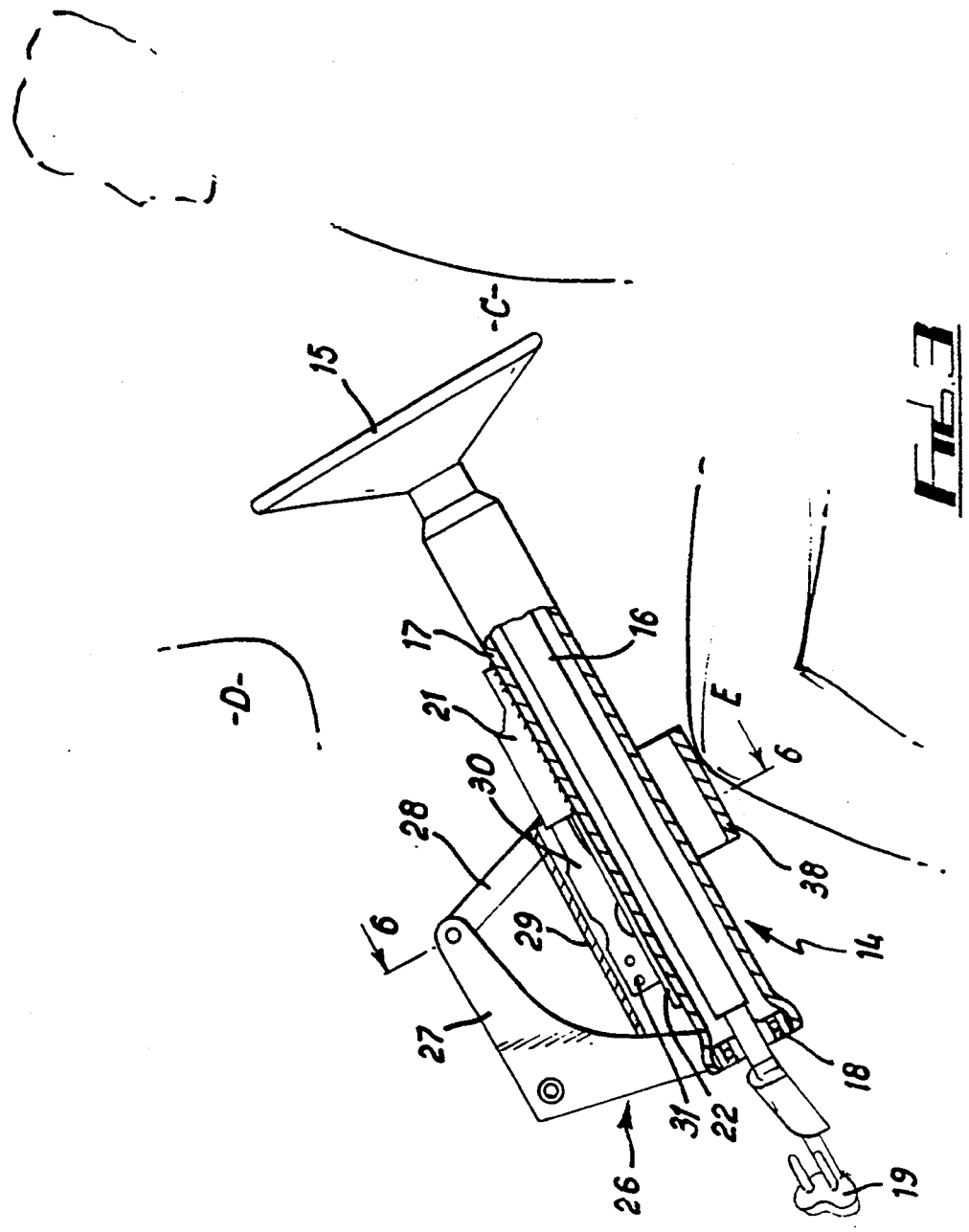

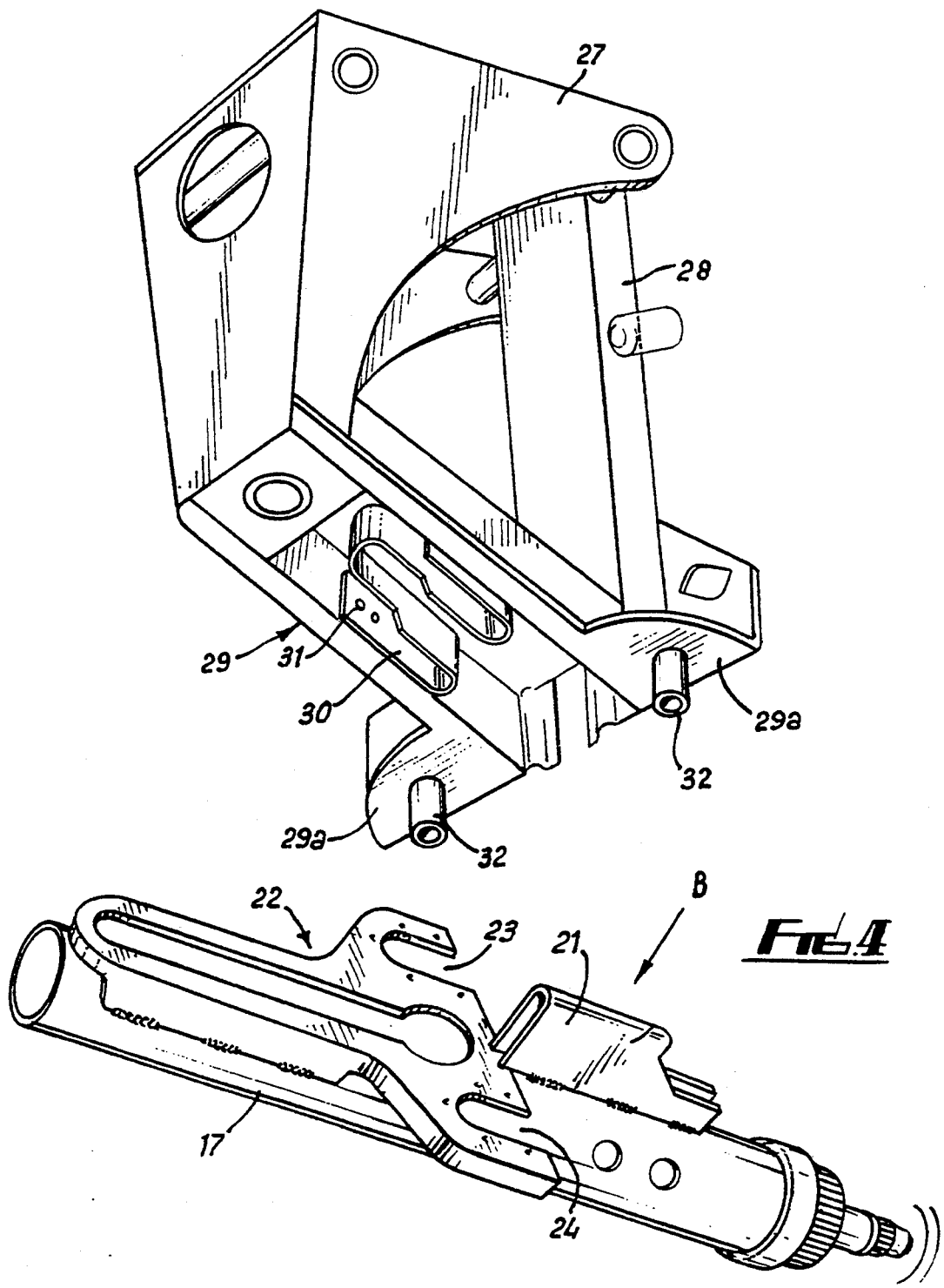

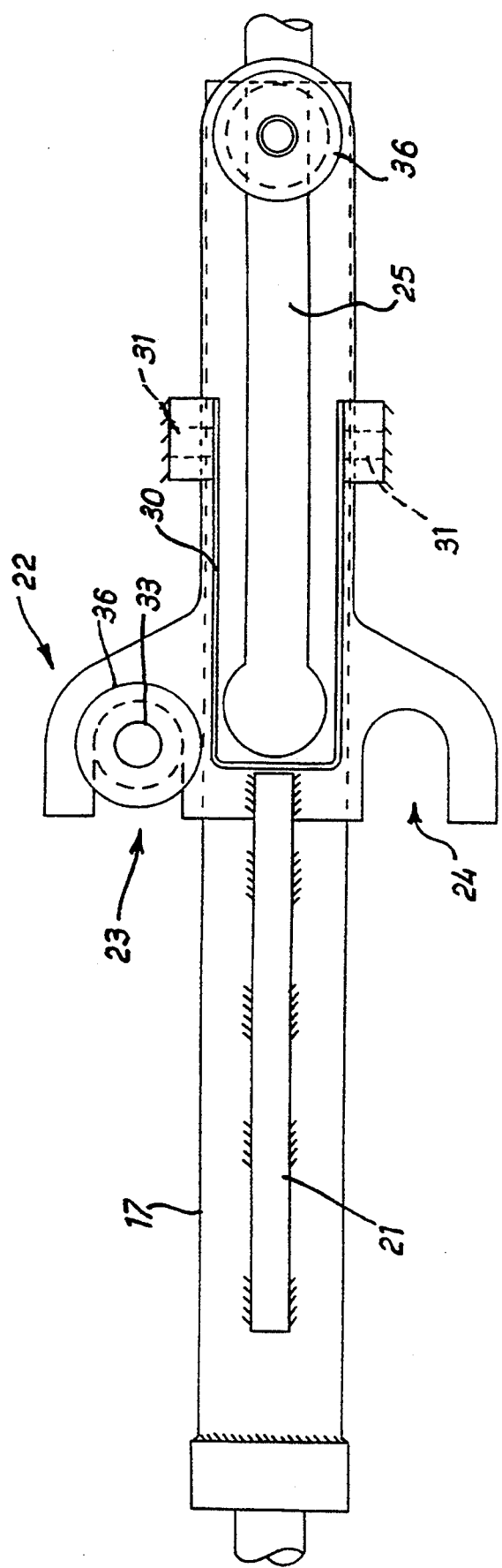

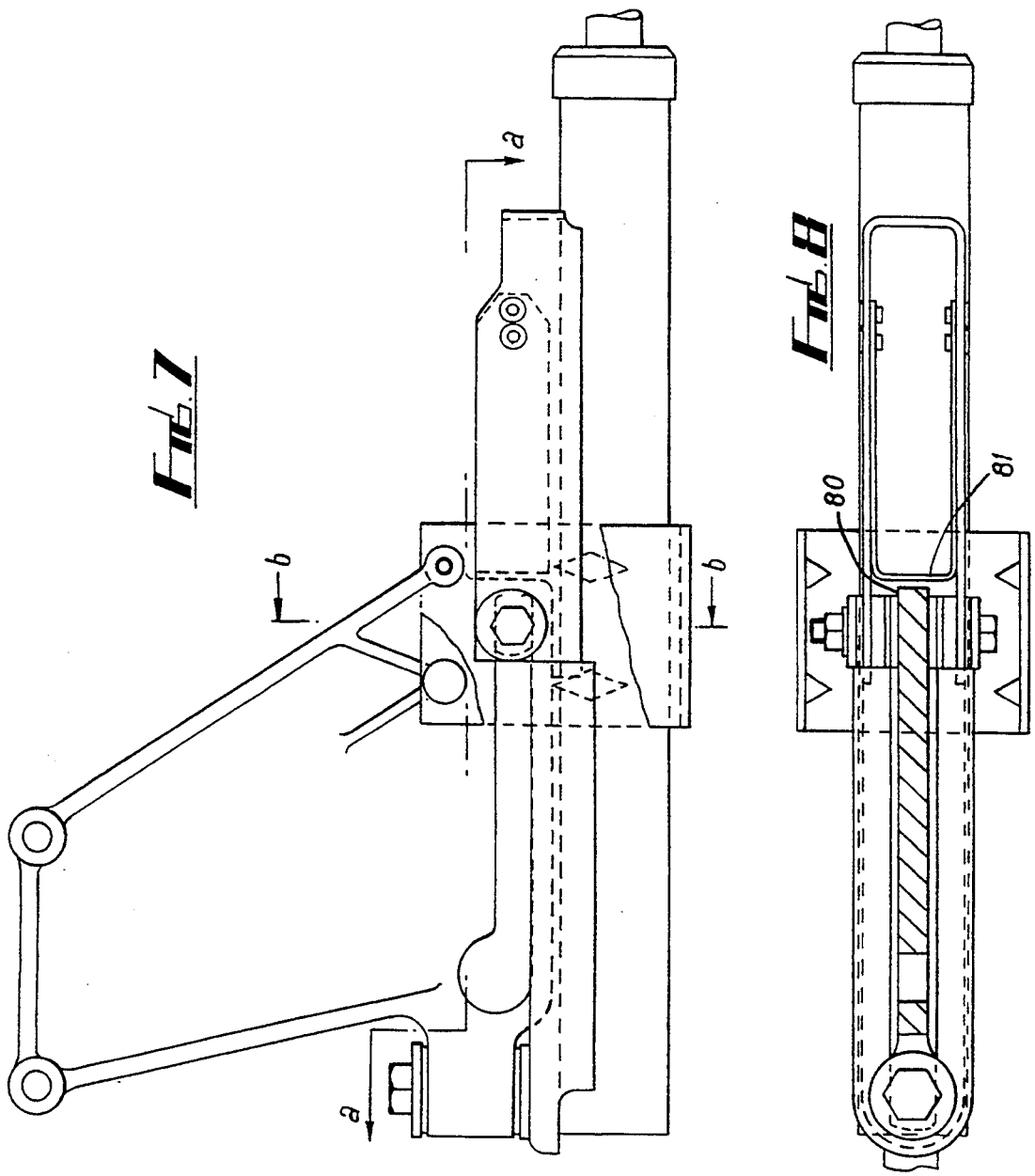

ENERGY ABSORPTION SYSTEM INCLUDING A U-SHAPED DEFORMABLE MEMBER AND A DEFORMING MEMBER

This is a continuation of application No. 07/942,318, filed on Sep. 11, 1992, which was abandoned upon the filing hereof a continuation of 07/620,764, filed Dec. 3, 1990, now abandoned.

The invention relates to an energy absorption system particularly, but not exclusively, for a collapsible steering column arrangement for vehicles.

Collapsible steering column arrangements are known. One such steering column arrangement with an energy absorbing element is disclosed in U.S. Pat. No. 4,786,076. In this arrangement the energy absorbing element is a shear plate forming part of a U shaped structure attached to a steering column. A bolted connection secures both the shear plate and its supporting U shaped bracket to the vehicle frame. Therefore the force required to rupture the shear plate is very much dependent on the pre-load applied to the bolted connection and a special cup spring is fitted to the bolted connection to provide variable adjustment of this friction force. Also the steering shaft is fitted with a protective cylindrical steering member. This is fastened to the steering column so that impact loads coming on to this protective member are transmitted to the steering column. Thus side loads coming from this area are added to direct loads acting on the steering wheel making it difficult to provide a uniform rate of energy absorption for the steering column, per se.

An alternative arrangement is disclosed in U.S. Pat. No. 4,117,741. In this arrangement the energy absorbing member is in the form of a simply supported beam having a portion with a reduced cross section and with bolted end connection. The bolted connection is taken back to the vehicle frame so that it is difficult to distinguish between restraining loads and loads due to deformation. During impact the deflected form of the energy-absorbing member takes up more space than the initial undeflected form. This can be a disadvantage in steering column assemblies where space is at a premium.

According to the present invention, there is provided an energy absorption system comprising a generally U-shaped deformable member, and a deforming member spaced, in an inoperative position, away from the deformable member, the two members being relatively movable whereby, in operation, the deforming member is caused to deform the deformable member to reduce the overall length of the deformable member in the direction of the legs of the U and absorb energy in so doing.

In a preferred embodiment of the invention, the system forms part of a collapsible steering column arrangement for a vehicle such as, for example, an automobile or a motorboat. The deformable member is connected to a fixed support for the steering column and the deforming member to the steering column itself or vice-versa. The deformable member may be of any suitable material, but mild steel is preferred. The shape and dimension of the deformable member and/or the deforming member are chosen to give desired energy absorption characteristics. The deforming member may be parallelpipedic or cylindrical. The deformable member may be profiled to have energy absorption peaks to cater for impact variations and produce a uniform energy absorption rate.

In order that the invention may be more clearly understood, one embodiment thereof will now be described, by way of example, with reference to the accompanying drawings, in which:

FIG. 3 is a diagrammatic part sectional view of a steering column arrangement for a vehicle incorporating an energy absorbing system of the type shown in FIGS. 1a, 1b, 1c, 2a and 2b.

FIG. 4 is a diagrammatic exploded perspective view,

Figure 5A:
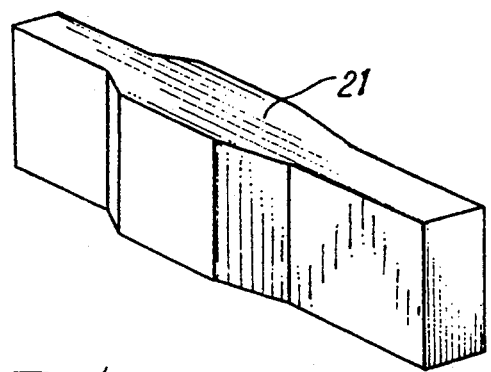
Figure 6:
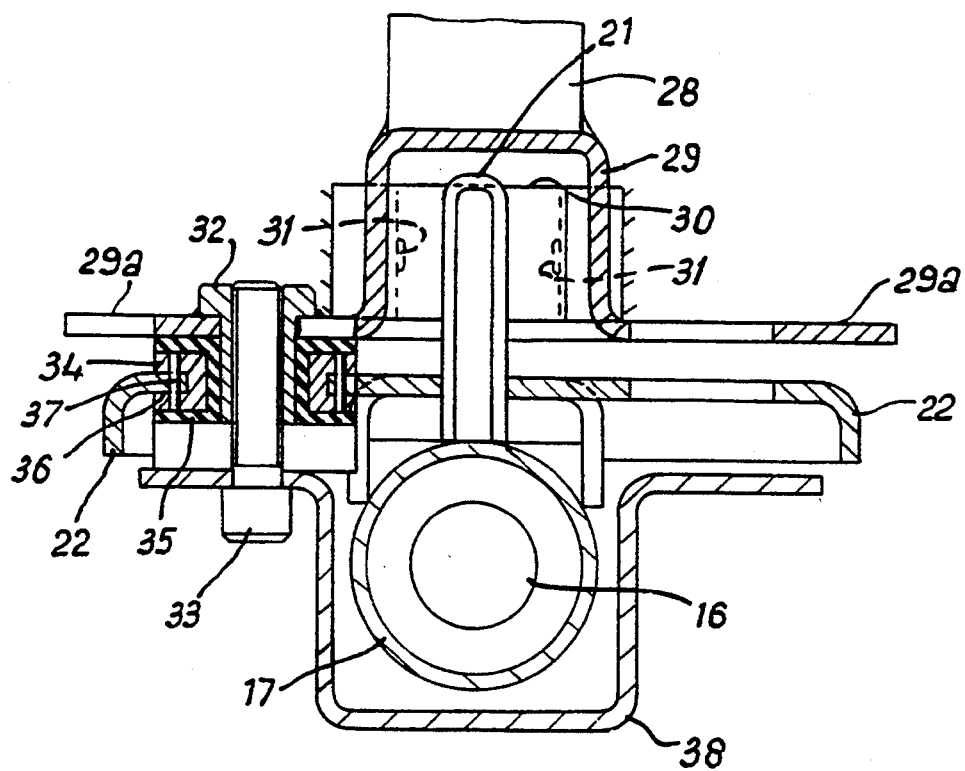

FIG. 5 is a side elevational view in the direction of arrow B of part of the arrangement of FIG. 4, FIG. 5a is a profiled fin member, FIG. 6 is a cross-sectional view taken along the line 6—6 of FIG. 3, FIG. 7 shows a side elevational view of an alternative steering column arrangment to that of FIG. 3, FIG. 8 is a sectional plan view of the arrangement of FIG. 7, taken along the line a—a of FIG. 7, and FIG. 9 is a sectional end elevational view of the arrangement of FIG. 7 taken along the line b—b of FIG. 7.

Figure 1A:
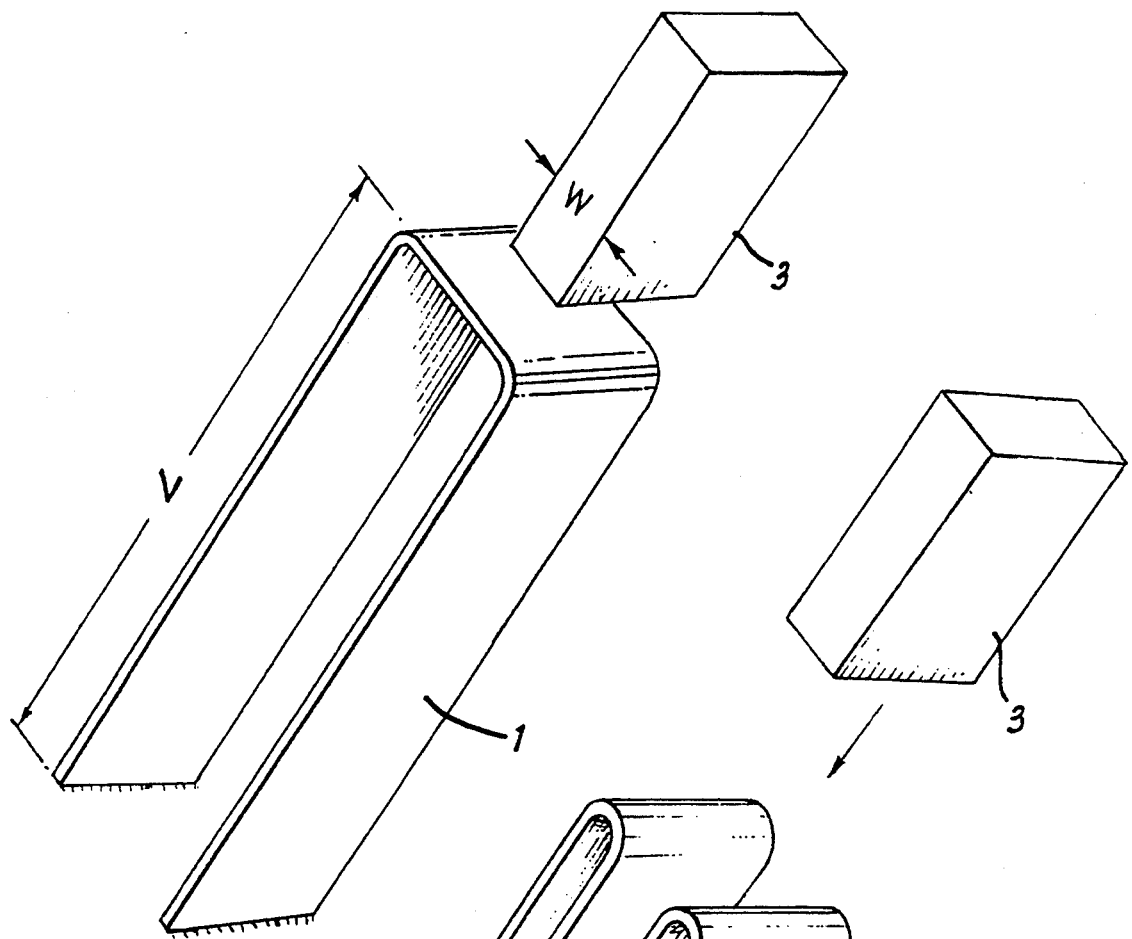
FIG. 1a shows a diagrammatic perspective view of an energy absorbing system prior to deformation.
Figure 1B:
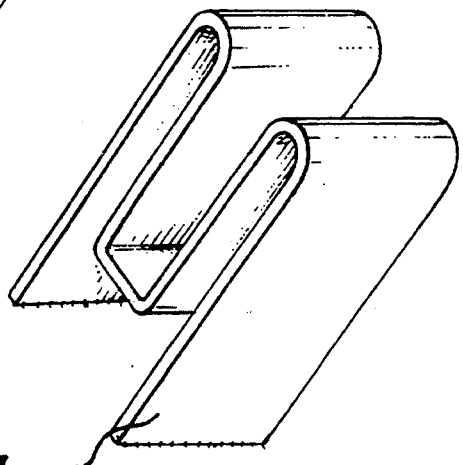
FIG. 1b shows a view of the system similar to FIG. 1a but after deformation.

Referring initially to FIGS. 1a and 1b of the drawings, the basic principle behind the invention will first be described, FIG. 1a shows a perspective view of an elongate U-shaped energy absorbing deformable member 1 and spaced from this member 1, a parallelepipedic deforming member 3. The deforming member has a smaller impact face than the bight of the U of the deformable member. In operation, the deforming member impacts the face of the deformable member at the center of the bight of the U. In a vehicle steering column arrangement member 1 is connected to the vehicle support and member 3 to the steering column of vice-versa as will be described in more detail later. FIG. 1a shows the normal non-operative position of the system, that is with member 1 undeformed. FIG. 1b shows the system of FIG. 1a after the vehicle steering column arrangement has been involved in an impact of sufficient force to activate the system such as would be produced if the vehicle were involved in an accident. In such an impact, deforming member 3 impacts upon deformable member 1 deforming the member 1 so as to produce an M-shape by deformation of the base of the original U thereby reducing the effective length of the member 1. It is in this deformation that the energy of the driver, moving forward with a significant velocity differential compared to the vehicle, as would occur in an accident, is absorbed in a controlled manner. This in turn reduces the risk of injury to the driver. The initially deforming load required may be varied by varying the width W (see FIG. 1a). The greater the dimension W the greater will be the load required initially to deform member 1.

Figure 1C:
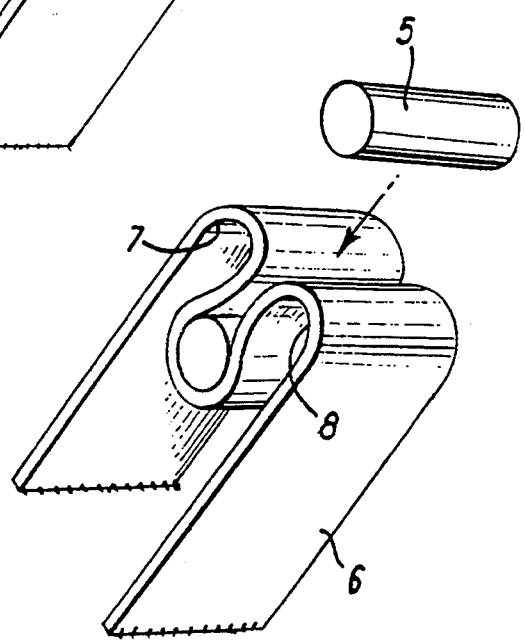
FIG. 1c shows a view similar to FIG. 1b but of an alternative system.

FIG. 1c shows a modification of the arrangment of FIGS. 1a and 1b in which the deforming member 5 is cylindrical and acts on a U-shaped deformable member 6. The choice of diameter of the cylindrical deforming member 5 influences to a large extent the form of the curves indicated at 7 and 8 which in turn influences the initial load required to deform member 6. Smaller curves will require greater energy to deform than larger curves.

Figure 2A:
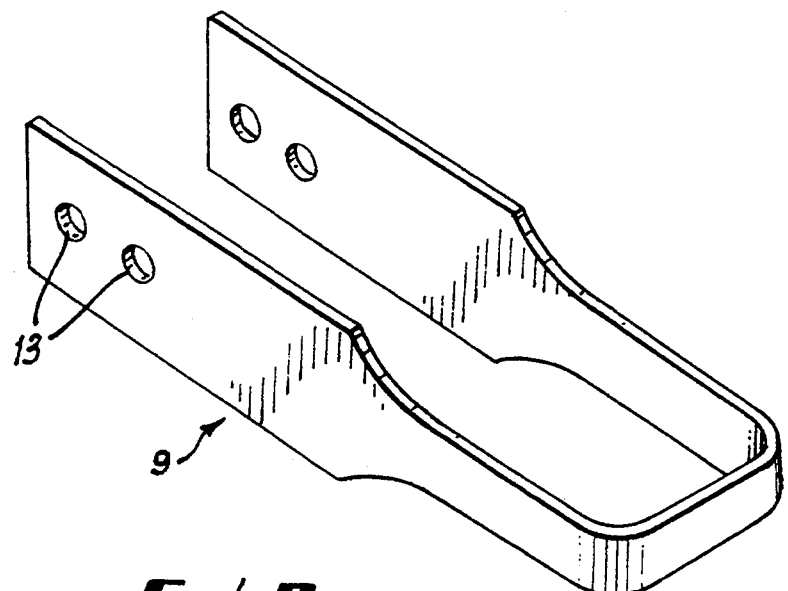
FIG. 2a shows a perspective view of an alternative deformable member to those shown in FIGS. 1a, 1b and 1c.
Figure 2B:
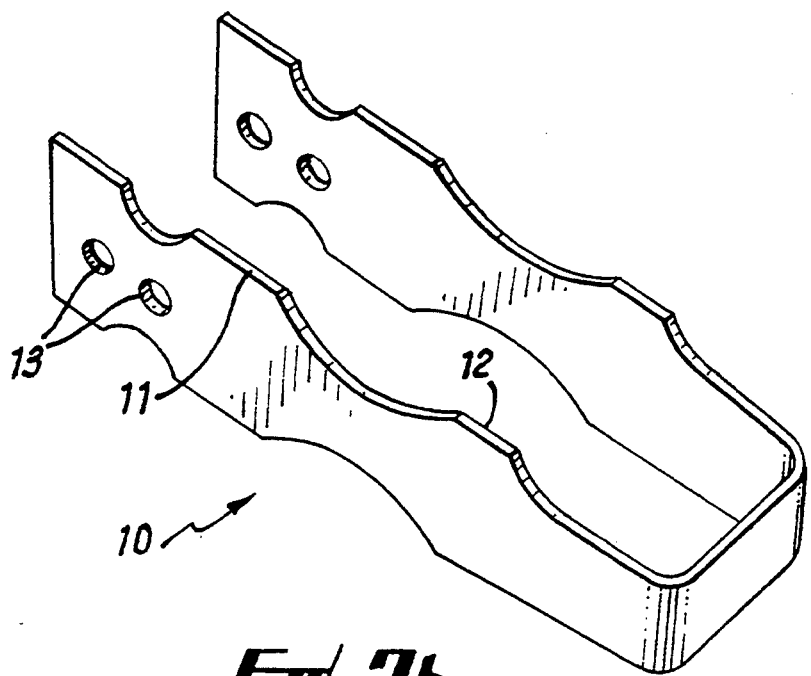
FIG. 2b shows a perspective view of another form of deformable member.

The load absorption rate can be predetermined in other ways. Apart from changing the material of the deformable member the deformable member can be shaped to influence the load absorption rate. FIG. 2a, for example, shows a deformable member 9 with a change of section whereby the load absorption rate changes as the deformable member is bent back upon itself. FIG. 2b shows a deformable member 10 having a more complex profile with peaks at 11 and 12 to provide a nett uniform load absorption rate as will be later explained. Holes 13 are to facilitate the pinning of the deformable member to its support member. A main advantage of the deformable member in the system according to the invention is that if the deformable member starts with a length L as shown in FIG. 1a, then, as it is rolled back upon itself under the impact load condition dimension L becomes shorter as shown in FIG. 1b. This is important in steering column assemblies when space is at a premium. Moreover it will be appreciated that the material of the deformable member is first formed into a curved shape and then stretched straight again and is rolled back upon itself twice and therefore the work rate is increased leading to greater energy absorption for the same amount of material. It will also be appreciated that deforming member acts to guide the material of the deformable member as it is moved as well as causing deformation.

FIGS. 3 to 6 show an energy absorption system of the above described type implemented in a vehicle steering column assembly.

The vehicle steering apparatus comprises a steering column assembly 14 including a steering wheel 15, connected to steering shaft 16 fitted within a steering tubular housing column 17 by means of the usual bearings 18 at top (not shown) and bottom. Steering shaft 16 connects to a coupling 19. A deforming member in the form of a guide fin 21 is rigidly attached to steering housing 17 as by welding. As shown in FIG. 5a, the fin 21 can be profiled to provide variation in load characteristics.

A T shaped support plate 22, best shown in FIGS. 4 and 5 is also attached to steering tube housing 17 as by welding. Support plate 22 is slotted at the head of the T at 23 and 24 and has a longitudinal slot 25 along the tail of the T for a purpose later to be explained. Each of the slots 23 and 24 is surrounded by an array of shear pin receiving openings in which, in the assembled conditioned, shear pins are located which cooperate with the end portions 29a of the main U-shaped member 29. As shown in FIG. 6, the width of the edges of the longitudinal slots are defined by the thickness of the support plate which is secured to the exterior surface of the tubular housing on the same side as is secured the deforming member 21.

Steering column assembly 14 co-operates with a support assembly shown generally at 26. Support assembly 26 comprises an L-shaped main bracket 27, brace member 28 and a generally inverted U shaped main member 29 connecting between bracket 27 and brace member 28. As best seen in FIG. 6, U shaped member 29 forms a housing for a deformable member 30 shown pinned to housing member 29 at 31.

Deformable member 30 can take any of the forms described with reference to FIGS. 1a, b and c and 2a and 2b. The support assembly 26 is attached to the frame of the vehicle in any suitable manner.

The steering column assembly 14 and support assembly 26 are mounted for movement relative to each other in a manner best seen in FIGS. 4 and 6. As seen in FIG. 6 the main U-shaped member 29 has attached thereto at end portions 29a, hollow internally screwed mounting elements 32. A screwed fastener element 33 co-operates with mounting element 32 and carries a U-shaped bracket member 38 (see also FIG. 3) whereby U-shaped member 38 is attached to main member 29 and thereby attached to the vehicle frame. Thus any load coming onto the bracket 39 is transferred directly to the vehicle frame.

An isolator disc 34 carrying a rubber vibration insulator insert 35 is located on mounting element 32 and serves to isolate the steering column assembly 14 from vibrations coming from the vehicle through support assembly 26. A slotted isolator disk is provided as at 36 to co-operate with each slot 23, 24 and also longitudinal slot 25 on plate 22. By means of this fastening arrangement steering column assembly 14 and support assembly 26 can be fastened together at a predetermined pre-load which is independent of the impact loading causing deformation of deformable energy absorbing member 30. Thus, three isolator disks are provided in the illustrated arrangement each having a central axis and first and second faces defining between them the groove around the periphery of the isolator disk. As shown in FIG. 6, each of said first and second isolator disks have a centrally located hole therethrough and an array of shear pin receiving holes distributed substantially uniformally about said central axis. The edges of the slots fit within the grooves of each said isolator disk. Deformable energy absorbing member 30 is shown in the undeformed state in FIG. 5 and in the deformed state in FIG. 4. Shear pins 37 connect the isolator disc 34 to the plate 22. Thus before relative motion can take place between the deforming member 20 and the deformable member 30 the preload of fastening elements 33 must be overcome and pins 37 must be sheared. Prior to such relative motion, the deforming member 20 is positioned so as not to interfere with the function of the isolator mounting.

In operation the impact loading due to an accident will overcome the pre-loading of the fastening elements 32 and 33, pins 37 will be sheared thus freeing the deforming member 20 to move against deformable member 30 which becomes deformed as discussed with reference to FIGS. 1a, 1b, 1c, 2a and 2b. In practice energy is absorbed for direct loads coming from impacts in the chest area C (see FIG. 3) and for additional indirect loading produced from impacts with fascia and instrument controls at area D. In accordance with the invention a uniform rate of energy absorption can be provided despite these additional loads by suitably designing the deformable member 30, for example deformable member 30 is designed to have the peaks 11, 12 shown in FIG. 2b. With this arrangement, the absorption rate of the deformable member 10 can be attuned to compensate for anticipated additional loads as noted above. By appropriately selecting the position of the peaks 11 and 12 and the depth of the corresponding troughs between peaks, the present invention affords the manufacture greater flexibility in accommodating loads for different types of vehicles. A further factor which makes it difficult to achieve a uniform load absorption rate is that loads coming from the knee area E conventionally impact the steering column assembly, per se. In accordance with the present invention impacts from the knee area are taken on U-shaped member 38, see FIGS. 3 and 6, and as previously described member 38 is tied to the frame of the vehicle. Thus in this arrangement the steering column assembly is free from loads coming from knee impacts. U-shaped member 38 conveniently can be an energy absorbing member as described with reference to FIGS. 1a, 1b and 1c. It could by expedient design absorb energy from the lower torso although it does not do so in this embodiment.

Preferred material for the U-shaped deformable member is mild steel.

FIGS. 7, 8 and 9 diagrammatically shown an alternative to the embodiment illustrated in FIGS. 3 to 6. In this alternative the U-shaped deformable member 81 is mounted on the column and the deforming member 80 on the column support, that is opposite to the arrangement of FIGS. 3 to 6 where the deforming member 21 is mounted on the column and the deformable member 30 on the column support. In all other respects, the alternative is the same as the FIGS. 3 to 6 embodiment.

It will be appreciated that the above embodiment has been described by way of example only and that many variations are possible without departing from the scope of the invention.

I claim: IN THE CLAIMS:

1. A collapsible vehicle steering apparatus comprising:
   a steering column assembly, said steering column assembly comprising,
   a tubular housing having a longitudinal axis and an exterior surface,
   a steering shaft, having first and second ends, disposed within said tubular housing,
   a steering wheel coupled with said first end of said steering shaft,
   a coupling connected with said second end of said steering shaft,
   a deforming member having a contact end, said deforming member being secured to said exterior surface of said tubular housing such that said contact end faces a direction parallel to said longitudinal axis of said tubular housing,
   a generally T-shaped support plate having a head portion and a tail portion extending away from said head portion, said support plate further having first and second slots located on opposite sides of said head portion and having an array of shear pin receiving openings distributed substantially uniformly about at least a portion of each of said first and second slots, said support plate further having a longitudinal slot along said tail portion, said first, second, and longitudinal slots further having edges having a width defined by the thickness of said support plate, said support plate being secured to said exterior surface of said tubular housing on the same side as is secured said deforming member such that said longitudinal slot is parallel to said longitudinal axis of said tubular housing,
   first, second, and third isolator disks each having a central axis and first and second faces defining between them a groove around the periphery of said isolator disk, said first and second isolator disks each having a centrally located hole therethrough and having an array of shear pin receiving holes distributed substantially uniformly about said central axis, said first, second, and third isolator disks disposed within, respectively, said first, second, and longitudinal slots of said support plate, said edges of said slots fitting within said grooves of said isolator disks,
   elastomeric vibration insulator inserts centrally disposed within each of said first, second and third isolator disks, and
   a plurality of shear pins inserted within said shear pin receiving openings of said support plate and said shear pin receiving holes of said first and second isolator disks so that said first and second isolator disks are secured in an initial position within said first and second slots of said support plate, and
   a support assembly attachable to a vehicle frame, said support assembly comprising,
   a main bracket,
   a brace member,
   a generally U-shaped main member having a first end connected to said brace member and a second end connected to said main bracket, said main member further comprising a pair of walls defining a space therebetween and flanges extending outwardly from said walls,
   two hollow internally threaded mounting elements each attached to one of said flanges of said main member proximate said first end of said main member, said mounting elements extending from said flanges and through said centrally located holes of said first and second isolator disks,
   a generally U-shaped second bracket disposed on the side of said tubular housing generally opposite said main member and enclosing a portion of said tubular housing, said second bracket having two walls and flanges extending outwardly from said walls, said flanges further containing mounting holes therein,
   screw fastener elements inserted through said mounting holes of said second bracket and cooperating with said mounting elements for mounting said second bracket and said steering column assembly to said support assembly, said screw fastening elements being adjustable in said mounting elements so as to develop a desired preload on said elastomeric vibration insulator inserts, and
   a generally U-shaped deformable member disposed within said main member, said deformable member having a pair of legs and a substantially flat bight portion connecting said legs, said legs each having a free end remote from said bight portion, said deformable member being attached at said free end of each said leg to each said wall of said main member so that said flat bight portion traverses said space between said walls of said main member and is out of contact with said contact end of said deforming member, said steering column assembly and said support assembly being mounted for relative movement so that, in operation, an impact force will overcome said preload within said elastomeric vibration insulator inserts and will shear said shear pins in said first and second isolator disks causing said first, second, and third isolator disks to slide within, respectively, said first, second, and longitudinal slots in said support plate, thus allowing said contact end of said deforming member to engage said flat bight portion of said deformable member and thus deform said deformable member in a direction parallel to said longitudinal axis of said tubular housing, the impact force energy being substantially absorbed by the deforming of said deformable member from said U-shape into an M-shape.

2. The collapsible vehicle steering apparatus of claim 1, wherein said support plate further has a planar surface and side surfaces extending perpendicularly therefrom, said first and second slots each have an opening facing away from the direction of said tail portion, said longitudinal slot has a proximate end at said head portion and an opposite remote end, said support plate is welded on said tubular housing such that said planar surface faces away from said tubular housing, said third isolator disk is initially positioned at said remote end of said longitudinal slot, each said elastomeric vibration insulator insert surrounds each said central axis of each said isolator disk, said flanges of said main member further have enlarged portions at said first end of said main member, each said mounting element is attached to one of said enlarged portions of said flanges of said main member, and said deformable member is of mild steel.

3. The collapsible vehicle steering apparatus of claim 1, wherein said deforming member is generally parallelepipedic and further has two edges and a longitudinal axis, said deforming member being welded along one of said edges to said exterior surface of said tubular housing such that said longitudinal axis of said deforming member is parallel to said longitudinal axis of said tubular housing.

4. The collapsible vehicle steering apparatus of claim 1 wherein said deforming member is cylindrical in shape having a longitudinal axis, said cylindrical deforming member being attached to said exterior surface of said tubular housing so that said longitudinal axis of said cylindrical deforming member is substantially perpendicular to said longitudinal axis of said tubular housing.

5. The collapsible vehicle steering apparatus of claim 1 wherein said deformable member is secured to said exterior surface of said tubular housing of said steering column assembly and said deforming member is secured to said main member of said support assembly.

* * * * *